Figure 1:
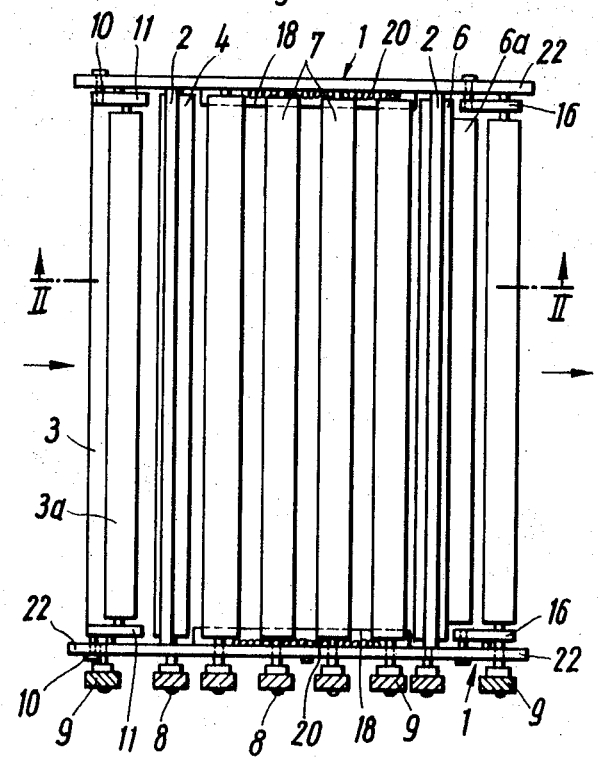

United States Patent
Aarnio

[15] 3,661,067
[45] May 9, 1972

[54] DEVICE FOR USE IN FILM DEVELOPMENT, FIXING, AND RINSING TROUGHS WITH PARALLEL DRIVE ROLLERS

[72] Inventor: Jaakko Aarnio, Ulappasaarentie 8 D 47, Helsinki 98, Finland

[22] Filed: Apr. 10, 1970

[21] Appl. No.: 27,204

[52] U.S. Cl. ................................. 95/89 A, 226/189, 271/51
[51] Int. Cl. ................................................................ G03d 3/00
[58] Field of Search ................ 95/89 R, 89 A, 94; 271/51; 226/187, 189, 108

[56] References Cited

UNITED STATES PATENTS

| | | | |
|---|---|---|---|
| 3,226,111 | 12/1965 | Ellis | 271/51 |
| 2,913,975 | 11/1959 | Bridgman et al. | 95/94 |
| 3,435,749 | 4/1969 | Cauwe et al. | 226/189 X |
| 3,422,741 | 1/1969 | Fleisher et al. | 226/189 X |

Primary Examiner—Samuel S. Matthews
Assistant Examiner—Richard L. Moses
Attorney—Woodling, Krost, Granger and Rust

[57] ABSTRACT

A device for use in film development, fixing, and rinsing troughs, to which are mounted and which include parallel driving rollers at intervals all located in the same plane. Counter rollers are located in contact with the driving rollers and a bevel tooth spindle wheel is connected to one end of each driving roller and a spindle which is in contact with each spindle wheel is mounted on a common driven shaft.

2 Claims, 2 Drawing Figures

Inventor:
Jaakko Aarnio

DEVICE FOR USE IN FILM DEVELOPMENT, FIXING, AND RINSING TROUGHS WITH PARALLEL DRIVE ROLLERS

The object of this invention is to accomplish a device in film development, fixing, and rinsing troughs, to which are mounted parallel driving rollers at intervals in the same plane, and counter rollers in contact with these and a bevel tooth spindle wheel is mounted to one end of each driving roller, and a spindle in contact with each spindle wheel is mounted on a driven common shaft a.

In film development it is previously known to use devices where the path formed by the driving and counter rollers approach at first the bottom of the development trough and turn thereafter upwards to the upper part of the trough, then downwards into the fixing trough and continuing from here in the corresponding manner to the rinsing trough. A great number of driving rollers and counter rollers are therefore needed, particularly in handling cut films, and also special guides at least at the turning points of the film, so that the film will move securely from one pair of driving roller to the other. However, a device like this has a complicated construction and is therefore sensitive to operational disturbances.

Attempts have been made to eliminate the above-mentioned disadvantages with devices of the type defined in the beginning of this specification. In order to treat the film with liquid on both sides, the film is conducted in one such previously known device with the axles of each roller pair opposite one another in the vertical plane, through development, fixing, and rinsing troughs, or film treating containers, with shuttle-shaped cross-section arranged one after another. The film enters the successive film treating containers through a horizontal slit provided with packings and leaves through a similar slit on the opposite side, while the driving rollers driven by the spindle wheels mounted on the common axle and the corresponding counter rollers are situated between the film treating containers. Each container has its own liquid storage tank, and a pump for continuous pumping of liquid into the film treating container, and from here the liquid is brought back to the storage tank. Because a device like this requires a separate storage tank for liquid and a pump including pipes for each film treating container provided with packing, the construction is very complicated and expensive. As in addition the developer and the fixer in circulating between the film treating container and the storage tank is under the influence of oxygen in the air, they rapidly loose their effectiveness and have thus to be replaced at short intervals of time.

The aim of this invention is to eliminate the above-mentioned drawbacks, and this is accomplished by the device according to the invention which is chiefly characterized in that in the direction of the moving film, the obliqueness of the teeth of the spindle wheel of the first and the last driving roller is opposite to the obliqueness of the teeth of the spindle wheels of the other driving rollers, and that the direction of the thread of the first and the last spindle is opposite to the direction of the thread of the other spindles, while the directions of rotation of the first and the last driving rollers and corresponding counter rollers, are correspondingly opposite to the direction of rotation of the other driving rollers and corresponding counter rollers, and that the first and the last counter roller with respect to the driving rollers are mounted on opposite side relative to the other counter rollers.

The device according to the invention is simple in construction and dependable to operate, and is therefore extremely suitable for treating cut film in particular. Although the driving rollers as well as the corresponding counter rollers are in contact with the film treating liquid, i.e. the film is treated with liquid on both sides, no such film treating containers provided with packings are needed where the treating liquid has to be circulated continuously by means of pumps, but only successive troughs are needed on each of which the device according to the invention fast and easy can be detachably mounted. Thanks to the construction of the driving organs of the driving rollers, and the arrangement of the driving as well as counter rollers in the device according to the invention, also the cut films will be guided entirely automatically and securely from one trough to the other without guiding means of any other kind.

Figure 2:
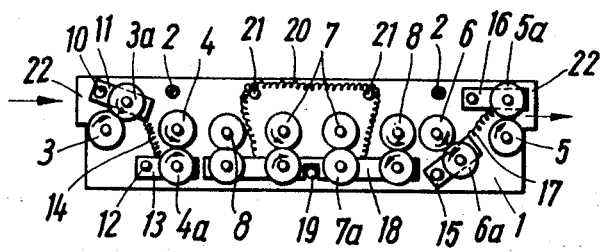

The invention is described in the specification further below, and is illustrated in the enclosed schematical drawing, in which FIG. 1 is a plan view of a device according to the invention, and FIG. 2 is a section taken along the line II—II in FIG. 1 in the direction of the arrows.

The body of the device according to the invention presented in the drawing consists of two side plates 1 a spaced distance from each another, and two crossbars 2 connecting these together. The side plates 1 are generally rectangular and parallel, with their broad sides vertical. In the case presented the axles of eight parallel driving rollers are mounted in the same horizontal plane to the side plates,. The first driving roller in the direction of the moving film presented by straight arrows, is presented by the symbol 3, the second by 4, the last by 5, the second last by 6, and the middle four by 7. The distance between the first driving roller 3 and the second driving roller 4, and correspondingly between the last and the second last driving rollers 5 and 6, is greater than the distance between any other two successive driving rollers 7, for a purpose explained below. One end of the axles 8 of the driving rollers extend through one side plate 1 and these ends are provided with bevel tooth spindle wheels 9. The obliqueness of the teeth is of the same direction in the spindle wheels of the first and the last driving roller 3 and 5, while in the other driving rollers 4, 6 and 7 mutually of the same direction. However, the obliqueness of the teeth in the first and the last spindle wheel then is opposite to the obliqueness of teeth in the last-mentioned spindle wheels. A spindle (not shown)mounted to the common driven shaft is in contact with each spindle wheel, while the direction of the thread on the first and the last spindle is opposite to the direction of the thread of the other spindles. In the case presented the spindle rotates the first and the last spindle wheel and thus the corresponding driving rollers 3, 5 clockwise, and the other spindle wheels and thus the corresponding driving rollers 4, 6, 7 counterclockwise, as the arrows in FIG. 2 indicate.

One end of a lever 11 is mounted to turn about a horizontal pivot 10 at the inside wall of both side plates 1, above the first driving roller 3. The axles of the first counter roller 3a are mounted to the free ends of these levers 11 in such a way, that this counter roller will be situated somewhat ahead of the driving roller 3, resting against it somewhat in front of and below its highest point. The first driving roller 3 and counter roller 3a serve as feed rollers for the film, as will be seen later. Below the second driving roller 4, mounted turnably about horizontal pivots 12 at the inside wall of the side plates 1, are levers 13 with the second counter roller 4a mounted to their forward end in such a way, that this is located vertically opposite the driving roller 4 above it. The levers 11 and 13 on the same side are connected by a pulling spring 14, so that the counter rollers 3a, 4a are pressing elastically against the corresponding driving rollers 3, 4. The second driving roller 4 and the counter roller 4a serve as guide rollers for the film.

A counter roller 6a is mounted to levers 15 turnably mounted below the second last driving roller 6 at the exit end of the device, so as to rest against the roller 6 below and in front of it. The second last driving roller 6 and counter roller 6a also serve as guide rollers for the film, as explained in connection with the operation of the device. Again, the counter roller 5a of the last driving roller 5 is mounted to its respective levers 16 in such a manner, in that it is located vertically opposite the driving roller 5. The levers 15 and 16 on the same side are connected to one another by means of a pulling spring 17, enabling the counter rollers 5a and 6a to press elastically against the driving rollers. The last driving roller 5 and counter roller 5a may well be called film discharge rollers.

The counter rollers 7a of the four intermediate driving rollers 7 are mounted to a support 18 at the inside wall of the side plates 1, so that each counter roller 7a is situated below its corresponding driving roller 7, and vertically opposite the same. Both supports 18 are provided at the center with an opening entered by a supporting peg 19 fixed to the inside surface of the side plate 1. This allows the support to move a little vertically and slightly turn about the supporting peg. A pulling spring 20 with its ends connected to both supports 18 extends between its ends around two pins 21, or the like, fixed to the upper edge of the side plate 1 a distance from one another in the longitudinal direction to form a spring loop. Thanks to these pulling springs 20 the intermediate counter rollers 7a rest resiliently against the corresponding driving rollers 7 situated above.

The diameter of both driving rollers and counter rollers is equal, and these may be made of, for instance, steel pipes or rods and may be coated by rubber or other elastic material.

The device dealt with above is placed into successive film development, fixing, and rinsing troughs to rest on extensions 22 at the ends of the side plates 1, and they are fixed in place by means of screws or other easily fastened and opened fixing means. It is practicable if the liquid in the troughs essentially reaches to the level of the axles of the driving rollers. The troughs including the devices presented above are covered by a suitable detachable cover.

The film to be treated, for instance a photographic or an X-ray film, is fed between the feed rollers of the above presented device placed in the development trough, i.e. between the first driving roller 3 and the counter roller 3a, so that when these rotate in the direction of the arrows the film moves forward and at the same time diagonally downward, thanks to the staggered position of these rollers relative one another, and its forward end enters between the guide rollers, i.e. between the second driving roller 4 and the corresponding counter roller 4a. Thereafter the film moves forward between the intermediate driving rollers 7 and the corresponding counter rollers 7a. On meeting the other pair of guide rollers, i.e. the second last driving roller 6 and its counter roller 6a, the end of the film is conducted diagonally upward and enters between the discharge rollers, i.e. between the last driving roller 5 and the counter roller 5a, whereupon the film leaves the device over the transversal rim of the trough and is guided between the feed rollers of a device similar to the above fitted into the fixing trough. After passing through this device the film moves into another similar device in the rinsing trough, and ends up in the dryer.

Naturally, the invention is not restricted to the above described mode of application, but it may be varied to a marked degree within the scope of the invention. This particularly concerns the number of driving rollers including corresponding counter rollers, as well as the spring arrangement of the levers of the counter rollers and the supports, and may be accomplished in any suitable way for the purpose of pressing the rollers yieldingly against each other.

I claim:

1. A device for use in film development, fixing, and rinsing troughs, to which are mounted parallel driving rollers at intervals all in the same plane, and counter rollers in contact with these, at which a bevel tooth spindle wheel is mounted to one end of each driving roller, and a spindle in contact with each spindle wheel is mounted on a driven common shaft, and at which the film is arranged to move continuously through liquids contained in the said successively arranged troughs, characterized in that the obliqueness of the teeth on the spindle wheel (9) of the first and the last driving roller (3 and 5) in the direction of movement of the film is opposite to the obliqueness of the teeth on the spindle wheels (9) of the other driving rollers (4,6,7), and the direction of the thread of the first and the last spindle is opposite to the direction of the threads of the other spindles, at which the directions of rotation of the first and the last driving roller (3,5) and of the corresponding counter rollers (3a,5a) are correspondingly opposite to the direction of rotation of the other driving rollers (4,6,7) and their counter rollers (4a,6a,7a), and that the first and the last counter roller (3a,5a) with respect to the driving rollers are situated on the opposite side relative to the other counter rollers (4a,6a,7a).

2. Device as claimed in claim 1, characterized in that the first and the last counter roller (3a,5a) are mounted to the levers (11,16) turnably mounted to the body of the device above the driving roller (3,5), while the other counter rollers (4a,5a,7a) are correspondingly situated below the corresponding driving rollers (4,6,7), that the first counter roller (3a) contacts the mantle surface of its driving roller (3) at a point forward from the vertical plane through its axle and somewhat downward from the horizontal plane tangent to its upper surface, in order to conduct the film diagonally downward between the next roller pair (4,4a), and that the second last counter roller (6a) is mounted to the levers (15) turnably mounted to the body of the device, so as to contact the mantle surface of its driving roller (6) forward from the vertical plane through its axle (8) and somewhat above the horizontal plane tangent to its lower mantle surface, in order to guide the film diagonally upward between the last roller pair (5,5a), while the driving rollers (5,7) of the other counter rollers (5a,7a) and the corresponding driving rollers (5,7) are vertically opposite one another.

* * * * *